(12) United States Patent
Pu et al.

(10) Patent No.: US 11,330,297 B2
(45) Date of Patent: May 10, 2022

(54) METHODS INCORPORATING EXTENSIONS TO COPY-ABOVE MODE FOR PALETTE MODE CODING

(71) Applicant: QUALCOMM Incorporated, San Diego, CA (US)

(72) Inventors: Wei Pu, San Diego, CA (US); Feng Zou, San Diego, CA (US); Marta Karczewicz, San Diego, CA (US); Rajan Laxman Joshi, San Diego, CA (US); Joel Sole Rojals, La Jolla, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1314 days.

(21) Appl. No.: 14/818,134

(22) Filed: Aug. 4, 2015

(65) Prior Publication Data
US 2016/0057447 A1 Feb. 25, 2016

Related U.S. Application Data

(60) Provisional application No. 62/065,519, filed on Oct. 17, 2014, provisional application No. 62/083,066,
(Continued)

(51) Int. Cl.
*H04N 7/12* (2006.01)
*H04N 19/593* (2014.01)
(Continued)

(52) U.S. Cl.
CPC ......... *H04N 19/593* (2014.11); *H04N 19/105* (2014.11); *H04N 19/159* (2014.11);
(Continued)

(58) Field of Classification Search
CPC ... H04N 19/105; H04N 19/182; H04N 19/593
See application file for complete search history.

(56) References Cited

U.S. PATENT DOCUMENTS

| 5,883,678 A | 3/1999 | Yamaguchi et al. |
| 8,805,096 B2 | 8/2014 | Gilgen |
(Continued)

FOREIGN PATENT DOCUMENTS

| CN | 103826028 A | 5/2014 |
| GB | 2523992 A | 9/2015 |
(Continued)

OTHER PUBLICATIONS

Ye J., et al., "Non-CE6: Copy previous mode", Mediatek Inc., Joint Collaborative Team on Video Coding (JCT-VC) of ITU-TSG 16 WP 3 and ISO/IEC JTC 1/SC 29/WG 11, No. JCTVC-S0120, 19th meeting, Oct. 17-24, 2014, 5 Pages.
(Continued)

*Primary Examiner* — Y Lee
(74) *Attorney, Agent, or Firm* — Shumaker & Sieffert, P.A.

(57) ABSTRACT

Methods incorporating extensions to copy-above mode for palette mode coding are disclosed. In one aspect, the method includes coding a current pixel of a current block of video data in copy-previous mode via coding a previous line index. The coding of the current pixel in copy-previous mode further including identifying a number of candidate values for the previous line index, identifying a number of escape pixels in a column of pixels above the current pixel in the current block, and reducing a number of candidate values of the previous line index by the number of identified escape pixels.

8 Claims, 10 Drawing Sheets

Related U.S. Application Data filed on Nov. 21, 2014, provisional application No. 62/086,617, filed on Dec. 2, 2014, provisional application No. 62/039,217, filed on Aug. 19, 2014, provisional application No. 62/040,864, filed on Aug. 22, 2014.

(51) Int. Cl.

| | | |
|---|---|---|
| *H04N 19/27* | (2014.01) | |
| *H04N 19/93* | (2014.01) | |
| *H04N 19/105* | (2014.01) | |
| *H04N 19/159* | (2014.01) | |
| *H04N 19/167* | (2014.01) | |
| *H04N 19/182* | (2014.01) | |
| *H04N 19/186* | (2014.01) | |
| *H04N 19/85* | (2014.01) | |

(52) U.S. Cl.
CPC ......... *H04N 19/167* (2014.11); *H04N 19/182* (2014.11); *H04N 19/186* (2014.11); *H04N 19/27* (2014.11); *H04N 19/85* (2014.11); *H04N 19/93* (2014.11)

(56) References Cited

U.S. PATENT DOCUMENTS

| | | | |
|---|---|---|---|
| 9,710,929 | B2 | 7/2017 | Huang et al. |
| 2008/0228813 | A1 | 9/2008 | Weiss et al. |
| 2009/0249451 | A1 | 10/2009 | Su et al. |
| 2015/0016501 | A1 | 1/2015 | Guo et al. |

FOREIGN PATENT DOCUMENTS

| | | |
|---|---|---|
| WO | WO-2015091879 A2 | 6/2015 |
| WO | WO-2015096157 A1 | 7/2015 |
| WO | WO-2015096812 A1 | 7/2015 |

OTHER PUBLICATIONS

Chen J., et al., "Description of screen content coding technology proposal by Qualcomm", 17. JCT-VC Meeting; Valencia, (Joint Collaborative Team on Video Coding of ISO/IEC JTC1/SC29/WG11 and ITU-T SG.16), No. JCTVC-Q0031, Mar. 18, 2014 (Mar. 18, 2014), XP030115915, pp. 1-18.

Chuang T.D., et al., "CE1-Related: Row-Based Copy Pixel from Neighbouring CU," MediaTek Inc., Joint Collaborative Team on Video Coding (JCT-VC) of ITU-T SG 16 WP 3 and ISO/IEC JTC 1/SC 29/WG 11, JCTVC-U0066, 21st Meeting: Warsaw, PL, Jun. 19-26, 2015, 8 pages.

Cohen R., et al., "BoG on SCCE3 Palette Coding Mode," 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0346-v6, Jul. 6, 2014 (Jul. 6, 2014), XP030116667, p. 13, section "JCTVC-R0202", 19 pages.

Guo et al., "RCE4: Test 1. Major-color-based screen content coding", 16. JCT-VC Meeting; Jan. 9 through 17, 2014; San Jose; (Joint Collaborative Team on Video coding of ISO/IEC JTC1/SC29/WG11 and ITU-TSG.I6); URL: http://wftp3.itu.int/av-arch/jctvc-site/, No. JCTVC-P0108, 12 pp.

International Search Report and Written Opinion—PCT/US2015/043746—ISA/EPO—dated Feb. 8, 2016.

Kim J., et al., "CE6-related : Enabling Copy above Mode Prediction at the Boundary of CU," 19. JCT-VC Meeting; 17-10-201 Oct. 24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/, No. JCTVC-S0114, Oct. 8, 2014 (Oct. 8, 2014), XP030116870, 7 pages.

Lainema. J et al., "Intra Coding of the HEVC Standard" IEEE Transactions On Circuits And Systems For Video Technology, vol. 22, No. 12, Dec. 2012, pp. 1792-1801.

Sun Y-C., et al., "CE6-related: Cross-CU Palette Colour Index Prediction," 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/, No. JCTVC-S0079, Oct. 8, 2014 (Oct. 8, 2014), XP030116820, 6 pages.

Sun Y-C., et al., "Non-RCE4: Cross-CU Major Color Index Prediction," 16. JCT-VC Meeting; Jan. 9, 2014-Jan. 17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P0093-v3, Jan. 9, 2014 (Jan. 9, 2014), XP030115576, 5 pages.

Ye J., et al., "CE1: Test A2—Generalized Copy above Mode", 20. JCT-VC Meeting; Feb. 10, 2015-Feb. 18, 2015; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-T0038, Jan. 31, 2015 (Jan. 31, 2015), XP030117146, 14 pages.

Zou, F., et al., "CE6: Test C.3 Copy Previous Row Mode For Palette Coding,"19. JCT-VC Meeting, Oct. 17, 2014-Oct. 24, 2014, Strasbourg, (Joint Collaborative Team on Video Coding of ISO/IEC JTC1/SC29/WG11 and ITU-T SG.16 ), URL: http://wftp3.itu.int/av-arch/jctvc-site/, No. JCTVC-S0174, Oct. 8, 2014 (Oct. 8, 2014), 5 pages, XP030116953.

Zou, F., et al., "Non-SCCE3: Copy from previous row mode for palette coding ," 18. JCT-VC Meeting; Jun. 30, 2014-Jul. 9, 2014; Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-R0282-v4, Jul. 4, 2014 (Jul. 4, 2014), 3 pages, XP030116495.

Guo L., et al., "Evaluation of Palette Mode Coding on HM-12.0+ RFxt-4.1," 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http:// wftp3.itu.int/av-arch/jctvc-site/, No. JCTVC-00218, Oct. 15, 2013 (Oct. 15, 2013), 7 pages; XP030115267.

Extended European Search Report—EP14709838—Search Authority—The Hague—dated Sep. 28, 2016.

Seregin V., et al., "Non-SCCE3: Run-length Coding for Palette Predictor," 18. JCT-VC Meeting; Jun. 30, 2014-Jul. 9, 2014; Sapporo; (Joint Collaborative Team on Video Coding of ISO/IEC JTC1/SC29/WG11 and ITU-T SG 16 ); URL: http://wftp3.itu.int/av-arch/jctvc-site/,, No. JCTVC-R0228, Jun. 21, 2014 (Jun. 21, 2014), 3 pages, XP030116529.

Zhu J., et al., "Non-SCCE3: Modified Escaped Pixel Mode in Palette based Coding", 18. JCT-VC Meeting; Jun. 30, 2014-Jul. 9, 2014; Sapporo; (Joint Collaborative Team on Video Coding of ISO/IEC JTC1/SC29/WG11 and ITU-T 50.16 ); URL: http://wftp3.itu.int/av-arch/jcivc-site/,, No. JCTVC-R0080-v2, Jul. 2, 2014 (Jul. 2, 2014), 10 pages, XP030116331.

Legend

☐ Pixel having a first palette value

▨ Pixel having a second palette value

▦ Pixels that cannot be coded

Ⓞ Current pixel

☒ Pixel coded in "escape mode"

METHODS INCORPORATING EXTENSIONS TO COPY-ABOVE MODE FOR PALETTE MODE CODING

INCORPORATION BY REFERENCE TO PRIORITY APPLICATIONS

This application claims the benefit of U.S. Provisional Application No. 62/039,217, filed Aug. 19, 2014, U.S. Provisional Application No. 62/040,864, filed Aug. 22, 2014, U.S. Provisional Application No. 62/065,519, filed Oct. 17, 2014, U.S. Provisional Application No. 62/083,066, filed Nov. 21, 2014, and U.S. Provisional Application No. 62/086,617, filed Dec. 2, 2014.

TECHNICAL FIELD

This disclosure relates to the field of video coding and compression, and particularly to palette mode coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

With the prevalence of high speed Internet access, emerging video applications such as remote desktop sharing, virtual desktop infrastructure, and wireless display require high compression efficiency of screen content. However, additional intra and inter video coding tools were designed primarily for natural content. Screen content may have significantly different characteristics compared to natural content (e.g., sharp edges and less or no noise). Thus, traditional coding tools geared toward natural content may not be ideal for coding screen content.

SUMMARY

The systems, methods and devices of this disclosure each have several innovative aspects, no single one of which is solely responsible for the desirable attributes disclosed herein.

In one aspect, a method removing redundancies for coding video data in palette mode comprises coding a current pixel of the current block in copy-previous mode via coding a previous line index, the previous line index indicating an index of a line including a pixel located above the current pixel in the current block, the coding of the current pixel in copy-previous mode further comprising: identifying a number of candidate values for the previous line index; identifying a number of escape pixels in a column of pixels above the current pixel in the current block; and reducing the number of candidate values for the previous line index by the number of identified escape pixels.

In another aspect, a device for encoding video data comprises a memory configured to store at least a portion of the video data; and at least one processor in communication with the memory and configured to: code a current pixel of a current block of the video data in copy-previous mode via coding a previous line index, the previous line index indicating an index of a line including a pixel located above the current pixel in the current block; identify a number of candidate values for the previous line index; identify a number of escape pixels in a column of pixels above the current pixel in the current block; and reduce the number of candidate values for the previous line index by the number of identified escape pixels.

In another aspect, a method for referencing neighboring pixels for coding video data in palette mode comprises determining whether a neighboring pixel that is located in a neighboring block is available; and coding a current pixel of a current block of the video data in copy-above mode via coding a run length value in response to the neighboring pixel being available, the current pixel being in the first line of the current block in scan order.

In yet another aspect, a device for encoding video data comprises a memory configured to store at least a portion of the video data; and at least one processor in communication with the memory and configured to: determine whether a neighboring pixel that is located in a neighboring block is available; and code a current pixel of a current block of the video data in copy-above mode via coding a run length value in response to the neighboring pixel being available, the current pixel being in the first line of the current block in scan order.

DETAILED DESCRIPTION

Figure 1A:
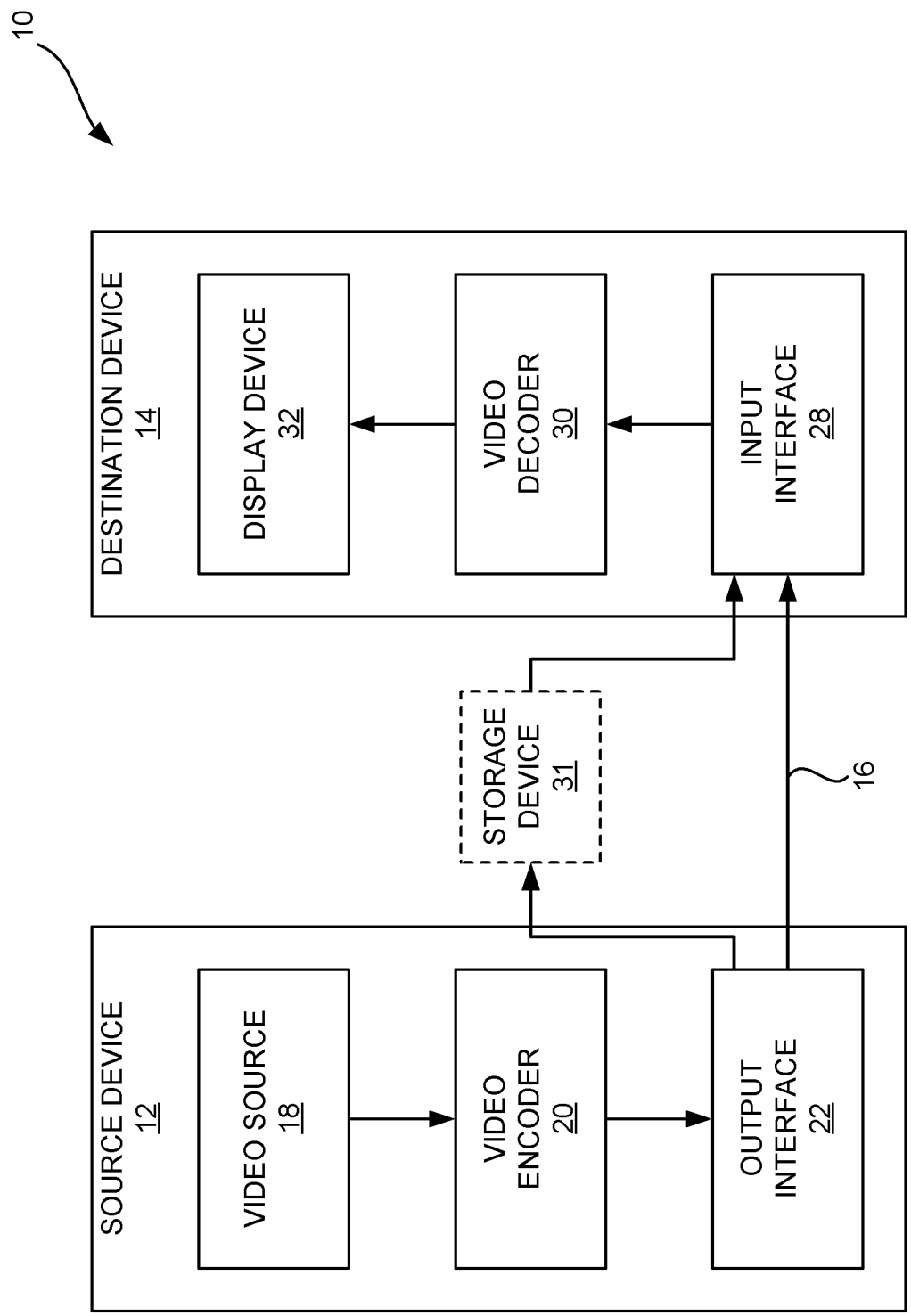
FIG. 1A is a block diagram illustrating an example video encoding and decoding system that may utilize techniques in accordance with aspects described in this disclosure.

In existing approaches to palette mode coding, there exist a number of redundancies in extending copy-above mode to copy from lines other than the directly previous line (i.e., copy-previous mode). These redundancies may result from situations in the copying from certain lines would be prohibited. Thus, by removing these situations from the copy-previous mode, the dynamic range of the coded previous line can be reduced, thereby improving coding efficiency.

In an existing approach to palette mode coding, an extension to copy-above mode may be implemented to facilitate copying pixel values from neighboring pixels outside of the current block—namely, copy-outside mode. Aspects of this disclosure relate to a number of different modifications to copy-outside mode which may increase the flexibility of copy-outside mode or provide additional techniques for the implementation of copy-outside mode.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), and HEVC including the range extension.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The range extension to HEVC is also being developed by the JCT-VC.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
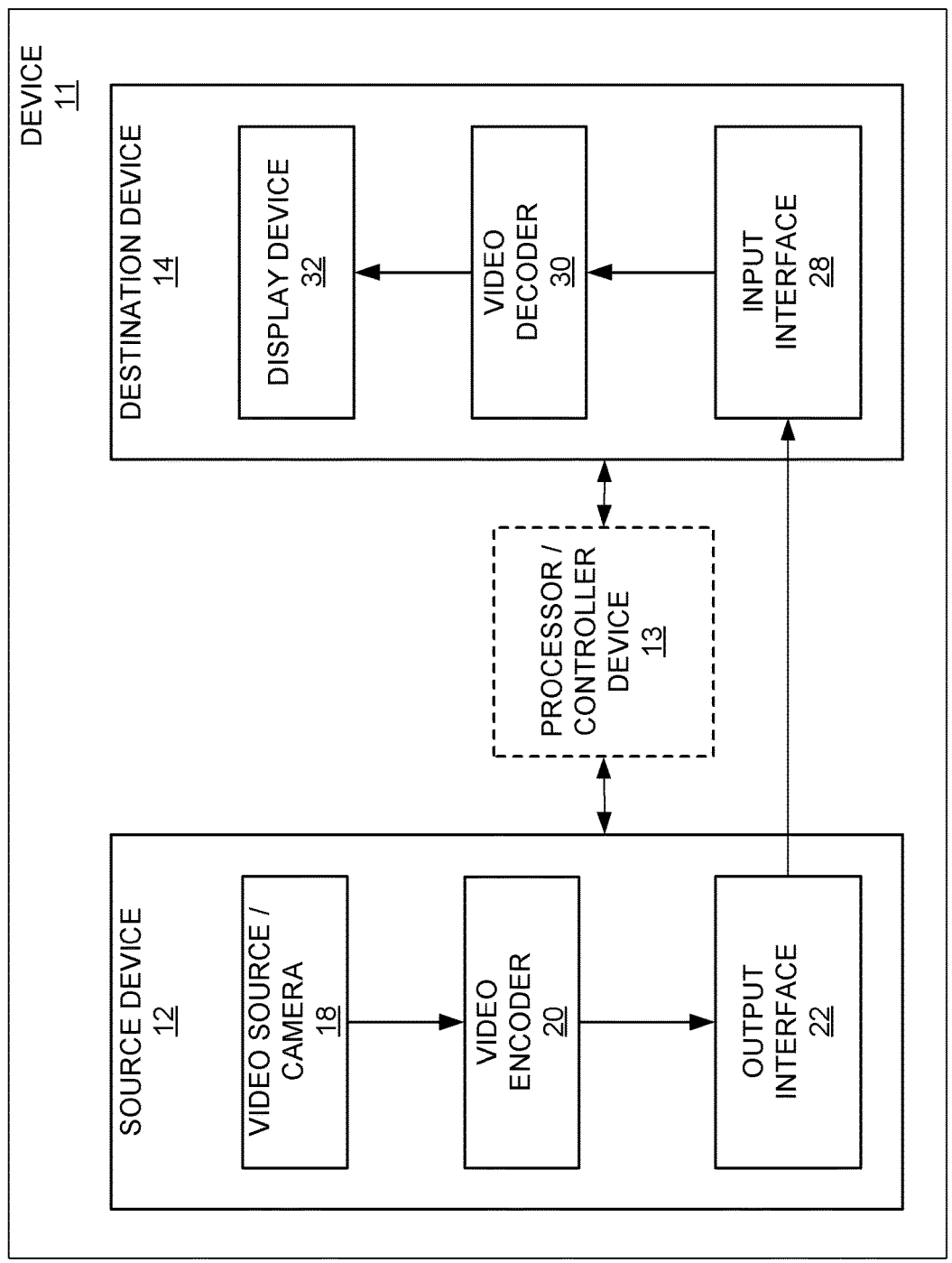
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
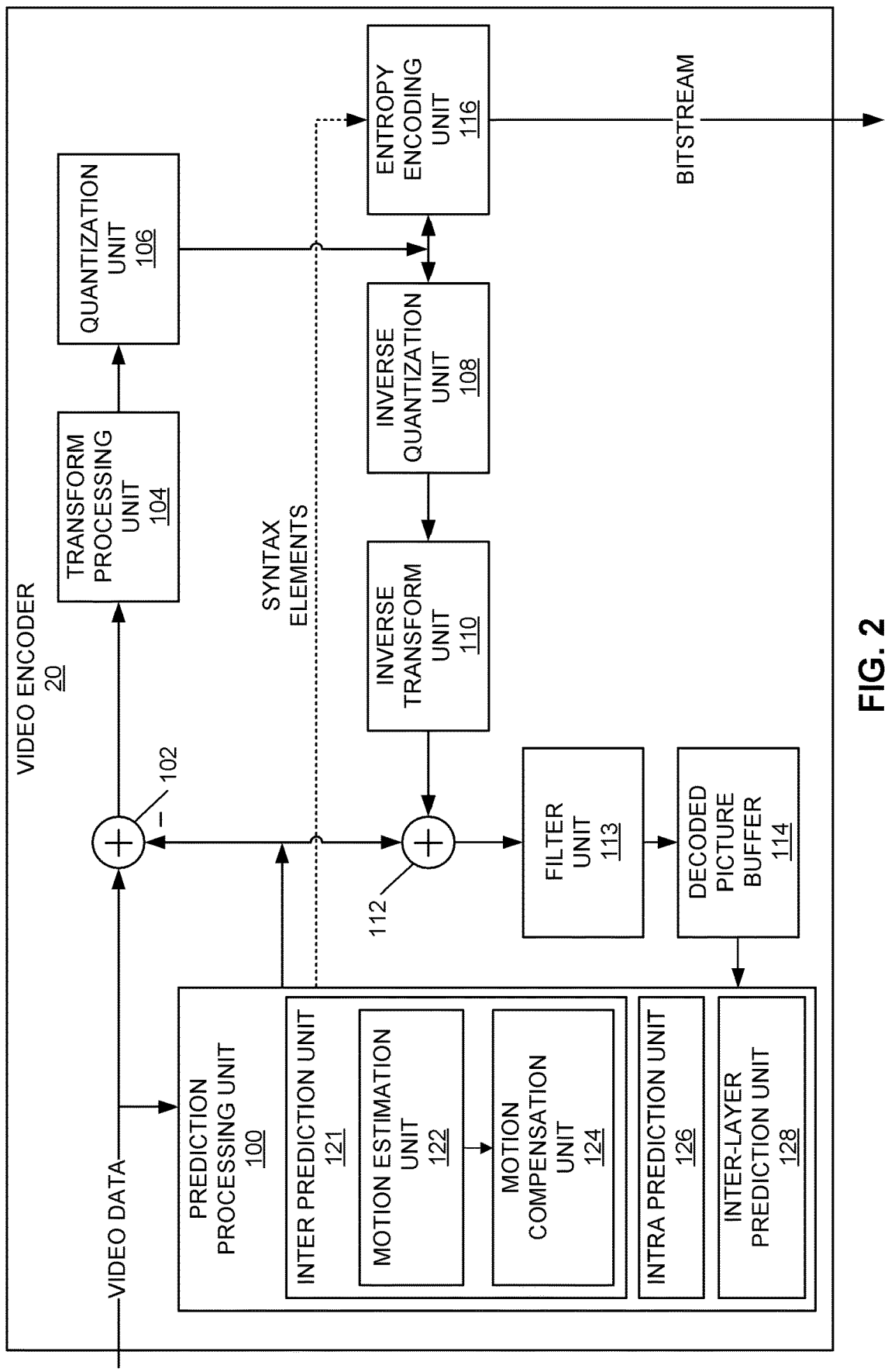
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
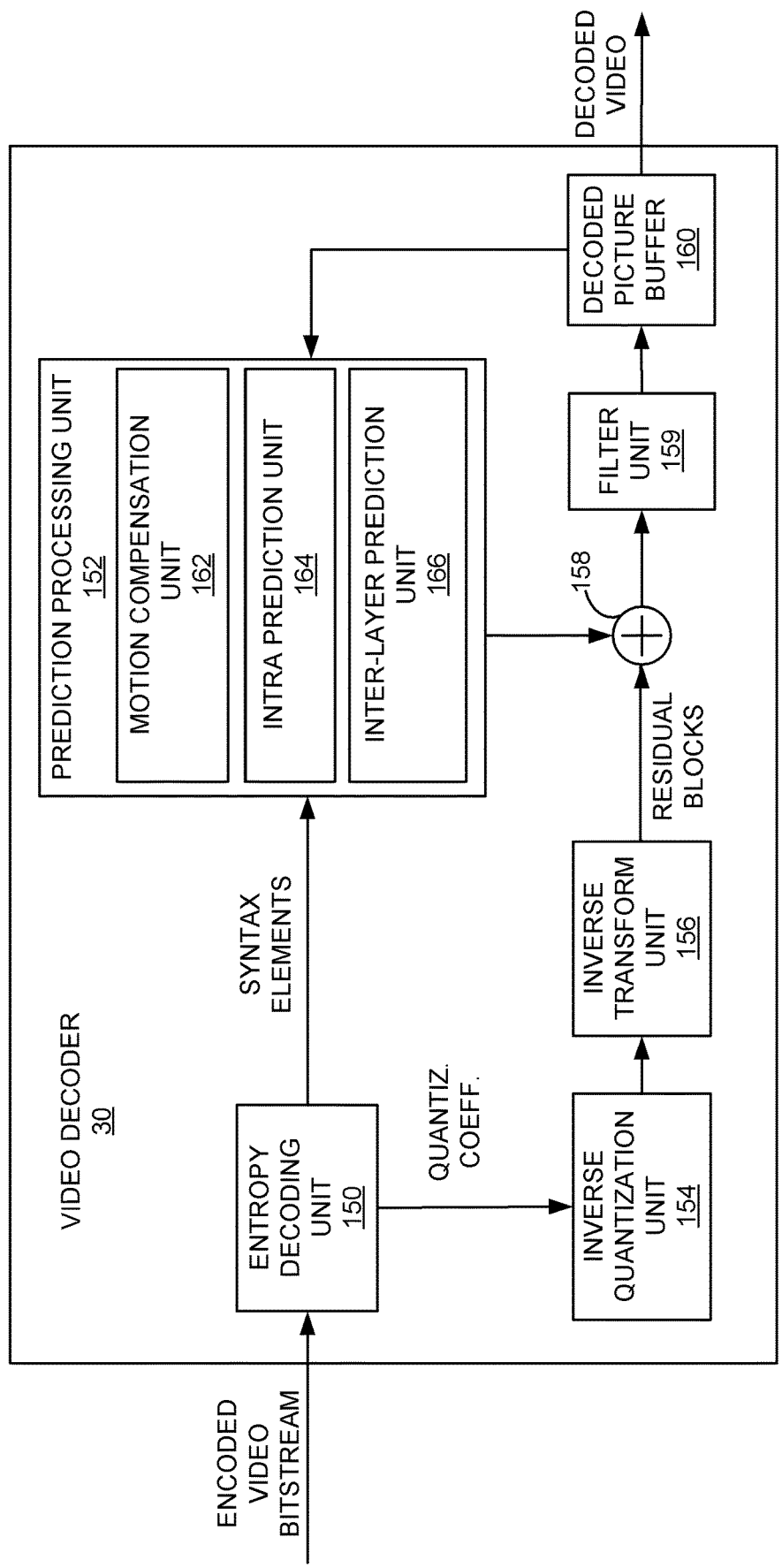
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Palette Coding Mode

In contrast to conventional intra and inter prediction that mainly removes redundancy between different coding units, palette coding targets the redundancy of repetitive pixel values/patterns within the coding unit. In the palette coding mode, a lookup table called a palette that maps pixel values into table indices (also called palette indices) is signaled first. In some implementations, the palette has a specified maximum size (e.g., 32 pixel values). The palette includes entries numbered by the table indices representing color component (e.g., RGB, YUV, etc.) values or intensities that can be used as predictors for block samples or as final reconstructed block samples. That is, in certain implementations, the palette indices may be used to predict the values of the corresponding pixels in the current block and, in other implementations, the palette indices may indicate the final color components of the corresponding pixels in the current block. In some implementations, samples in a palette block are coded using three run-modes, i.e. 'copy-left mode' (or run mode), 'copy-above mode', and 'escape mode' (or pixel mode).

For a position in the palette block that is coded in copy-left mode, a palette index is first signaled followed by "run_length" (or "palette_run") (e.g., M). No additional information needs to be signaled for the current position and the following M positions in the palette block because the current position and the following M positions in the palette block have the same palette index that is signaled for the current position. The palette index (e.g., i) is shared by all three color components, which means that the reconstructed pixel values are (Y, U, V)=(palette$_Y$[i], palette$_U$[i], palette$_V$[i]) (assuming the color space is YUV).

For a position in the palette block that is coded in copy-above mode, a value "run_length" (or "copy_run") (e.g., N) is signaled to indicate that for the following N positions (N+1 positions in total, including the current one) in the palette block, the palette index is equal to the palette index of the position that is directly above in the palette block.

For a position in the palette block that is coded in escape mode (or pixel mode), a pixel value corresponding to the current position in the palette block is signaled. Escape mode may be signaled using an escape flag (e.g., a flag value of 1 indicates that the current position is coded in escape mode) or a palette index (e.g., an index value that does not correspond to any of the palette entries or an index value that is greater than or equal to the palette size).

Palette entries include one or more pixel values each mapped to a table index. For example, if a given coding unit includes three unique pixel values (e.g., red, green, and blue), the palette entries may include three entries, (0, red), (1, green), and (2, blue). palette index map includes one or more palette blocks coded using the palette entries, where palette table indices (e.g., 0, 1, and 2 in the example above) are used to indicate the pixel values in the palette block.

Figure 4:
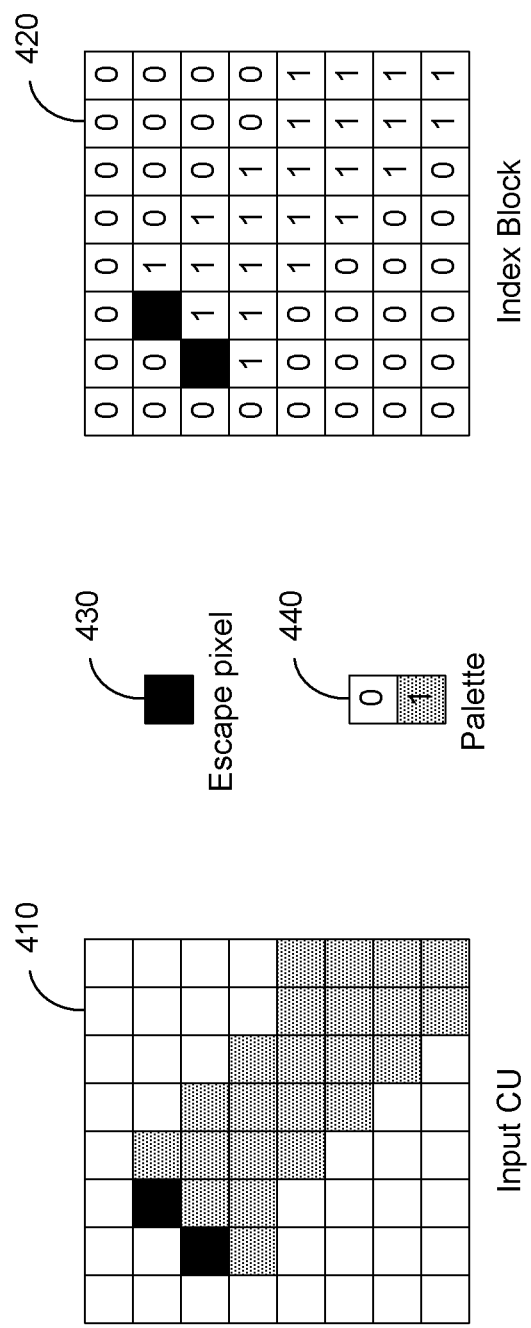
FIG. 4 is a block diagram illustrating an input CU, an index block, an escape pixel, and a palette associated with the CU.

FIG. 4 illustrates an example configuration of input CU 410, index block 420, escape pixel 430, and palette 440. As shown in FIG. 4, the input CU 410 contains three unique pixel values: white, grey, and black (for illustrative purposes). Based on the frequency of white and grey, only white and grey pixel values are included in the palette 440, where an index value of 0 is associated with the white pixel value and an index value of 1 is associated with the grey pixel value. The black pixel value that is not included in the palette is labeled as an escape pixel 430, which is coded independently of the palette. As shown in FIG. 4, the index block 420 includes an index value for each position in the block. Two positions in the index block 420 are coded as in escape mode (e.g., without referring to palette indices 0 or 1). Although only a single escape pixel and only two palette entries are used in the example of FIG. 4, the embodiments of the present application are not limited as such, and any number of escape pixels and palette entries may be used. In some embodiments, the palette size is limited to 32 entries, and any pixel values not associated with one of the 32 entries become escape pixels. The maximum palette size may be set to any number. Further, the CU size is not limited to 8 pixels by 8 pixels, and may be 16×16 or any other size.

Redundancy Removal for Copy-Previous Mode

As discussed above, in palette mode, a palette includes entries numbered by an index representing color component values that may be used as predictors for block samples or as final reconstructed block samples. Each entry in the palette may contain one color component (e.g., luma value) or two components (e.g., two chroma values) or three color components (e.g., RGB, YUV, etc.).

Previously decoded palette entries may be stored in a list. This list may be used to predict palette entries in the current palette mode CU. Samples in the palette block may be coded using three run-modes, such as, for example, 'copy-left', 'copy-above', and 'escape', or equivalents thereof.

In one aspect of this disclosure, it is desirable to improve the following aspects of predicting or coding a block in palette mode.

Techniques may be implemented to extend the copy-above mode. Besides copying from adjacent above neighbor, such techniques allow the copy to start from a non-adjacent above neighbor. In such a 'copy-previous' run mode, the starting position, e.g., row number y may be coded into the bitstream.

In related aspects, a truncated binary code or the like may be used. Because the line index y is restricted to be smaller than the current line index, x, minus 1, i.e., x−1, a maximum number of candidate values of y equal to x−2 may be used as an input.

When the previous pixel from the current position in scanning order is signaled as the end of a copy-previous mode, then starting row y for the current pixel cannot be the same as the starting row of the previous pixel, because otherwise the previous copy-previous run would have been extended by one to include the current pixel. Therefore, when the previous pixel used a copy-previous mode and the current pixel is also to be coded using a copy-previous mode, the dynamic range of y can be reduced by one.

Figure 5B:
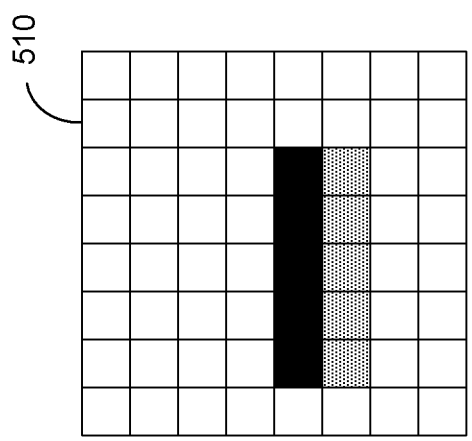
FIG. 5B is a block diagram illustrating an example of copy-previous in accordance with aspects described in this disclosure.
Figure 5A:
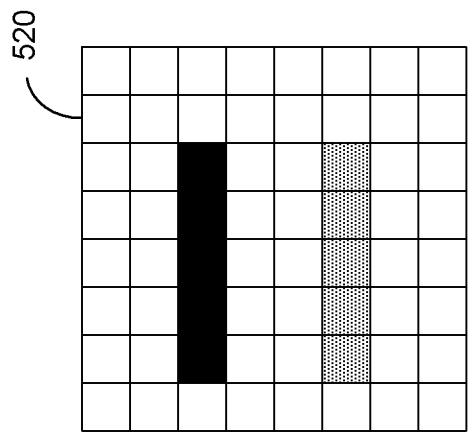
FIG. 5A is a block diagram illustrating an example of copy-above in accordance with aspects described in this disclosure.

FIG. 5A is a block diagram illustrating an example of copy-above in accordance with aspects described in this disclosure. FIG. 5B is a block diagram illustrating an example of copy-previous in accordance with aspects described in this disclosure. In each of FIGS. 5A and 5B, the current line is illustrated in gray and the above or previous line that is being copied is illustrated in black. In the implementation of FIG. 5A, in the copy-above mode the above neighboring row is copied. In the copy-previous mode of FIG. 5B, a previous line y is copied to the current line x.

To overcome the above-described issues with existing techniques for palette mode, this disclosure describes improvements below. It is noted that the following described techniques and approaches may be applied independently or in any combination.

In accordance with one or more aspects of the present disclosure, there are provided techniques for redundancy removal when coding the previous line y. The present disclosure describes techniques for coding the index of the previous line y directly. It is noted, however, that the same or similar techniques may be applied when coding the distance between the indices x and y, i.e., coding (x−y−2) instead of the index y.

There are a number of redundancies that may arise in the bitstream when coding in the copy-previous mode. For example, a first type of redundancy may occur if there are A (where A>=0) escape pixels in the column of the current pixel with a row index that is less than x−1. In this situation, the dynamic range of y can be reduced by A, because copy-previous mode cannot start from an escape pixel.

A second type of redundancy may occur if the current pixel's above adjacent neighbor is not an escape pixel and its index value is assumed to be I. The second type of redundancy may occur if there are B (where B>=0) pixels in the column of the current pixel with a row index that is less than x−1 having index value equal to I. In this situation, the dynamic range of y can be reduced by B. This is because, according to the up-to-date copy-previous mode, there may be a restriction that if the current pixel's index is the same as its above adjacent neighbor, the encoder cannot choose copy-previous mode.

A third type of redundancy may occur when coding the index value of a copy-left mode for the current pixel, if the current pixel's left neighbor in scanning order is the end of a copy-previous run, it can be assumed that such copy-previous copies from d lines above. If the pixel d lines above the current pixel is not an escape pixel, then the current pixel's index cannot be equal to the pixel d lines above the current pixel's index. Accordingly, the dynamic range of the current index can be reduced by 1. If the pixel d lines above the current pixel is out of the CU boundary, the corresponding value or index of that pixel may be set equal to a predefined value k. In a one embodiment, k=0.

Further, for the coding of y at the first line or the second line, in 'copy-previous' mode, the starting point for copy cannot be the current pixel's above neighbor. In another words, (y>=x−2). If (x<2), the 'copy-previous' mode cannot be selected. Thus, in certain implementations, another method in dealing with this boundary condition is proposed. When (x<2), if 'copy-previous' mode is used, then it is implicitly assumed that the line (x−2) is used as the starting point for copy. In this case, the coding of y can be bypassed and it is assumed that for every pixel in line (x−2), their index value is a predefined constant 'k'. In one configuration, k=0.

The three above-described redundancy removal methods and the method of coding y at the first line or the second line can be enabled simultaneously, or a coding device may use one or two or three of them only to reduce codec's complexity. In some embodiments, specified conditions may be used to indicate or infer which to use for the CU, or a portion of the CU (e.g., for particular pixels). In some embodiments, one or more syntax elements may be used to indicate which to use for the CU, or a portion of the CU (e.g., for particular pixels). In some embodiments, a combination of inference and syntax elements can be used to indicate which to use.

Figure 6:
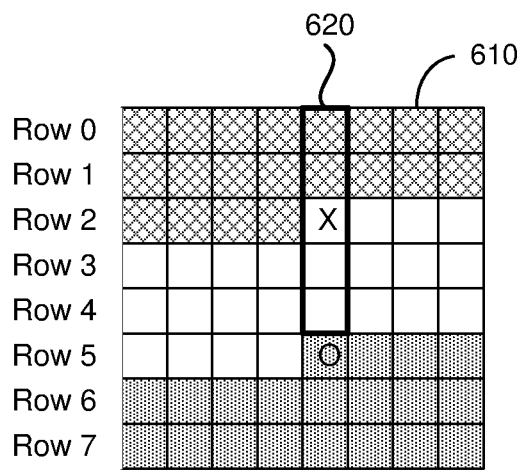
FIG. 6 is a block diagram illustrating an example of redundancy removal in palette mode in accordance with aspects described in this disclosure.

FIG. 6 is a block diagram illustrating an example of redundancy removal in palette mode in accordance with aspects described in this disclosure. In FIG. 6, pixels that cannot been coded are shown in grey, pixels that are white represent a first palette value, pixels that are cross-hatched represent a second palette value, the pixel labeled O represents the current pixels, and the pixel labeled X represents a pixel coded in 'escape mode.' Further, FIG. 6 includes a block 610 of pixels and a shape 620 which highlights the pixels in the column above the current pixel O.

An example of the removal of redundancies will now be described in connection with FIG. 6. Without exploiting the above redundancies, the dynamic range of the index y in FIG. 6 is 4, i.e., the largest number of candidate values for y is 4.

According to the removal of the first type of redundancy, y cannot be equal to 2, in which an escape pixel appears. Therefore, after removing the first type of redundancy, the dynamic range of y can be reduced to 3 (e.g., the candidate rows may be 0, 1, and 3).

According to the removal of the second type of redundancy, y cannot be equal to 3 since the pixel in row 3 has the same index as the pixel in row 4 within shape 620. Therefore, the dynamic range of y can be further reduced to 2 (e.g., the candidate rows may be 0 and 1).

In the example of FIG. 6, without exploiting the first and second types of redundancy removal, two bits are required to code the position of y. By exploiting first and second types of redundancy removal, only one bit is necessary to code the position of y.

Example Flowchart for Removing Redundancies for Palette Mode

Figure 7:
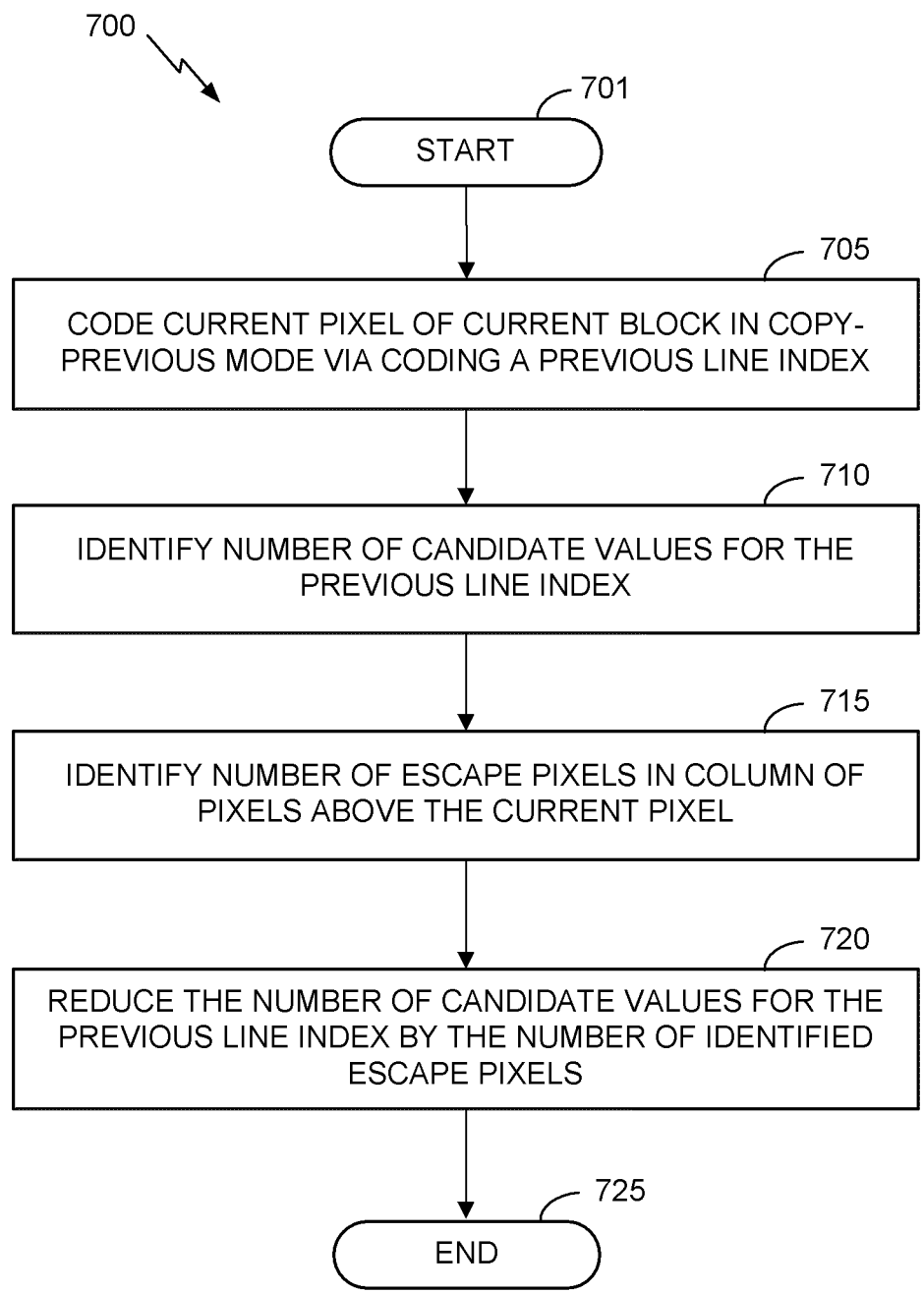
FIG. 7 is a flowchart illustrating a method for coding video data in accordance with aspects described in this disclosure.

With reference to FIG. 7, an example procedure for removing redundancies for coding video data in palette mode will be described. FIG. 7 is a flowchart illustrating a method 700 for coding video data in palette mode in accordance with aspects of the present disclosure. The steps illustrated in FIG. 7 may be performed by a video encoder (e.g., the video encoder 20), a video decoder (e.g., the video decoder 30), or component(s) thereof. For convenience, method 700 is described as performed by a video coder (also simply referred to as coder), which may be the video encoder 20, the video decoder 30, or another component.

The method 700 begins at block 701. At block 705, the coder codes a current pixel of a current block of video data in copy-previous mode via coding a previous line index. The previous line index indicates an index of a line including a pixel located above the current pixel in the current block. At block 710, the coder codes the current pixel of the current block in copy-previous mode via identifying a number of candidate values for the previous line index.

At block 715, the coder continues coding the current pixel in copy-previous mode via identifying a number of escape pixels in a column of pixels above the current pixel in the current block. At block 720, the coder continues coding the current pixel in copy-previous mode via reducing the number of candidate values for the previous line index by the number of identified escape pixels. The method 700 ends at block 725.

In the method 700, one or more of the blocks shown in FIG. 7 may be removed (e.g., not performed) and/or the order in which the method is performed may be switched. In some embodiments, additional blocks may be added to the method 700. The embodiments of the present disclosure are not limited to or by the example shown in FIG. 7, and other variations may be implemented in accordance with the present disclosure.

Copy-Above from Outside the Current Block

As previously described, in current implementations of palette mode, every pixel of a current block can be coded with the run mode, copy mode or escape mode excepting the very first row of the block when only run mode or escape modes are possible. The syntax element palette_run_type_flag may indicate whether run mode or copy mode is used. In run mode, a palette index palette_index may be signaled along with the run value palette_run. The run value indicates the number of pixels that will have the same palette index. In the Copy mode, only the run value is signaled indicating the number of pixels for which the palette index is copied from the pixels located directly above the current pixel. Escape mode may be coded within the run mode where a specific palette index is used to indicate this mode. In the current palette version, this index is equal to the palette size. In the escape mode, the run value is not coded since the mode is applied to single a pixel triplet (Y, U, and V) where the values of the colors are explicitly signaled as palette_escape_val. Copy mode is not enabled for the first row in the block since there is no above pixels belonging to the same block.

A flag palette_escape_val_present_flag may be signaled per block to indicate the usage of the escape pixels. This flag being equal to 1 indicates that there is at least one escape pixel in the palette coded block, and the flag is equal to 0 to indicated that there is not at least one escape pixel in the palette coded block.

In certain implementations, palette size is restricted to be in the range of 0 to max_palette_size which may be equal to 31.

For the block coded with palette mode, the palette may be predicted from the palette entries of the previously palette coded blocks, may be explicitly signaled as a new entries or the palette of the previously coded block may be completely reused. The case of completely reusing the palette of the previously coded block is called palette sharing and a flag palette_share_flag may be signaled to indicate that the entire palette of the previous block is reused without modification.

In palette mode, the pixel scanning in the block may be one of two types: a vertical traverse or a horizontal traverse (e.g., snake-like) scanning. The scanning pattern used in the block may be derived according to the flag palette_transpose_flag signaled per block.

During palette index coding, a palette index adjustment process may be applied. Starting from the second pixel in the block, the palette include adjustment process comprises checking the palette mode of the previous pixel in the scan order. First, the maximum palette index size is reduced by 1. If the palette mode for the previous pixel in scan order is equal to the run mode, the palette index to be coded is reduced by 1 if the index is greater than or equal to the palette index for the previous pixel in scan order. Similarly, if the palette mode for the previous pixel in scan order is equal to the copy mode, then the palette index to be coded is reduced by 1 if the index is greater than the above palette index. This description is provided from the encoding side, and the corresponding process can be performed in the reverse order at decoder side as well.

In JCTVC-S0114, it is proposed to enable copy-above mode for the first row of a block. In this case, a neighboring block's (i.e., a block neighboring to the left or above, depending on the scanning order) reconstructed pixel values may be mapped to the current block palette indices and those indices are assigned or copied for the pixels in the first row if the copy mode is enabled. The drawback of such approach is that the mapping process may not be simple and may be required at decoder side as well. As used herein, the term "copy neighbor pixels" generally refers to the neighboring pixels outside of the current block which may be used in copy-above mode.

In SCM-3.0, the following syntax optimizations were adopted:

When the palette size is 0, it may be inferred that all pixels are coded in escape mode and no escape present flag, palette mode, palette index, palette run, and palette transpose flag is signaled. Further, the escape present flag is inferred to be equal to 1, the palette mode is inferred to be equal to the INDEX mode, palette index is set equal to the ESCAPE, palette run value is set equal to the block size minus 1, and the palette transpose flag is set to 0.

When the palette size is 1 and no escape pixels are used in the block, then no palette mode, palette run, or palette transpose flag is signaled, and palette mode is inferred to be equal to the INDEX mode, palette index is set to 0, palette run value is set equal to block size minus 1, and the palette transpose flag is set to 0.

The following description details the case when the copy-above mode is enabled for the very first row in the block assuming the horizontal oriented scanning order, however similar methods can be applied to enable the copy-above mode when the vertical oriented scanning is used, where the actual pixels are copied from the left neighbor column. This case can be still termed copy-above mode with transposition.

Revisions to Copy-Above Mode for Copy Neighbor Pixels

In some embodiments, a video coding system (e.g., an encoder or decoder) may include the ability to enable palette index adjustment for the first row, since the row above the first row located in the neighbor block has the palette indices after the mapping process.

Figure 8:
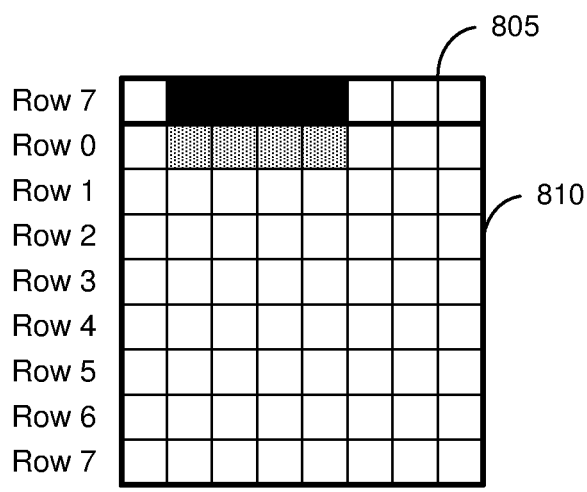
FIG. 8 is a block diagram illustrating an example of copy-outside in accordance with aspects described in this disclosure.

FIG. 8 is a block diagram illustrating an example of copy-outside in accordance with aspects described in this disclosure. FIG. 8 includes a previous block 805 and a current block. The grey pixels in FIG. 8 indicate pixels which are coded in copy-previous mode and the black pixels indicate neighboring pixels from which reconstructed values or palette indices, etc. are copied. The illustration of FIG. 8 is analogous to that of FIG. 5A except that the neighboring pixels are not in the current block 810 but rather are located in the previous or neighboring block 805.

In some embodiments, a video coding system may be restricted so as to not use mapping of the neighbor pixel values (color triplet) to the palette indices of the current block. Instead of pixel to palette index conversion, the reconstructed color values are directly copied from the above pixels of the neighboring block. In this case some artificial palette index, which may be denoted as copy_index, may be assigned to indicate such pixels. The following are possible ways for various examples for an encoder to encode the current palette mode when enabling copying of pixels outside the current block:

In a first option, the palette index adjustment is disabled when the previously code pixel is using the copy mode and the above pixel is copy_index. In this case, the copy_index is not a real palette index and doesn't create a redundancy in the palette index coding. At the decoder, for pixels labeled with copy_index, the neighboring pixel in the same column may be used to reconstruct the current pixel.

In a second option, the copy_index can be included into the palette indices. In this case a certain palette index is assigned. For example, copy_index may be equal to the palette_size and escape index may be equal to the (palette_size+1). In this case, the run mode may also be signaled for the copy_index and the run value can indicate the number of pixels copied from the above neighbor block pixels. This particular run mode is similar to the copy mode where the above reference pixels are located in the neighbor block, the only difference is that it is indicated by the run mode with a certain index (copy_index). In this situation, the palette index adjustment process may be applied.

In a third option, the copy neighbor pixels can be applied until the run mode or escape mode breaks the copy neighbor pixels mode. For example, the copy mode from the neighbor pixels may be used for the first pixels in the block with a certain run value, after the last pixel in this mode, the copy neighbor pixels is disabled and cannot be used or signaled in this block. In this case, the copy_index assigned for the pixels may be substituted with the valid palette index, for example 0, when those pixels are used as reference pixels for the copy mode of the later pixels or palette index adjustment process.

In the fourth option, the copy neighbor pixels outside of the block can be signaled as additional palette mode. For instance, besides the current existing run mode and copy mode, a third mode (copy-outside) is added in the available palette mode list. In addition, the signaling method is also extended to indicate the extended palette mode list. For example, a codeword "0" may be used to indicate run mode; "10" may be used to indicate copy-above mode; and "11" may be used to indicate copy-outside mode. Hereinafter, the term "copy-outside mode" will be used to describe the copy-above mode using copy neighbor pixels, regardless of whether the mode is separately signaled or integrated into the copy-above mode. And the index can be designed to indicate whether the pixel is copying from the pixels above the current block, similar as the second option mentioned above. Index adjustment may be enabled when the previously coded pixels is copy_index. Alternatively, an artificial index is assigned to pixels, and index adjustment is disabled when the neighboring pixel is copy_index.

All above-described examples can be applied individually or in any suitable combination in a particular embodiment of a video codec.

Availability of the Neighbor Pixels

In some cases, the reconstructed pixels of the neighbor block might not be available or may be treated as unavailable. Such cases may occur when the neighbor block belongs to another slice or tile. In another situation, when constraint intra prediction (CIP) is enabled and the reconstructed pixels of the neighbor block are from an inter coded block, such pixels are considered unavailable for the purpose of intra prediction, and a padding process may be applied to fill the unavailable pixels from the pixels of intra coded blocks. These padded pixels may be used to enable copy-outside mode for palette coding when CIP is enabled. CIP may generally refer to the limitation of the use of neighboring blocks in the intra prediction process. For example, a CIP flag may indicate that the neighbor pixels coded with inter-mode cannot be used as intra predictors.

In some examples, palette mode can be considered as an intra-prediction tool, and should follow the intra-prediction behavior. For example, if neighbor pixels belong to another slice, tile or inter-predicted block when CIP is enabled, the copy neighbor pixels may be disabled and optionally the palette mode does not needed to be signaled in the first row.

Alternatively, the reconstructed pixels may be derived in a similar way as is done for the reference pixels of the intra-prediction, for example padding may be applied with CIP mode. In other words, the intra reference pixels may be used in the copy-outside mode. Additionally, the neighboring reference pixels may be filtered before they are applied in palette coding.

In some additional embodiments, the availability check and handling may be applied to any method of using the neighbor block pixels in the palette mode, for example copy-outside mode with or without palette index mapping and similar modes.

In some examples, it is possible that only part of the pixels of the above row located in the above neighbor block is available. For example, when only a subset of the pixels may be inter coded and CIP is enabled only a subset of the pixels may be available. In this case, the copy-outside mode may be disabled for the entire row, or may be enabled only for the available neighbor pixels, or may be enabled for the entire row, but the default palette index, for example 0, may be used for the unavailable neighbor pixels.

The availability check can be done depending on the slice type, for example, if the neighbor block belongs to the same slice or tile, it may always be considered as available for the I-slices (i.e., where there is no temporal prediction). Further, depending on a CIP flag, the neighbor block of the same slice or tile may be considered as always unavailable for non-I slices with the CIP flag enabled.

As noted above, the default palette index may be used when the neighboring pixels are not available. The same idea can be applied, mutatis mutandis (i.e., with the necessary changes having been made), when the neighboring pixels are not used but might be still available, the switching between the default palette index or copy neighboring pixel, when the neighbor block is available, usage (or modes) may be indicated by a flag and the flag setting, for example, the usage may be controlled by an application or a user. The flag may be signaled in a bitstream, as for example discussed with respect to the below disclosure of a flag indicating usage of the copy-outside mode.

Mapping Neighbor Pixels to the Palette Indices

As discussed above, the reconstructed neighbor pixels may be mapped to the palette indices of the current block. In one implementation, the closest palette color with minimum deviation from the reconstructed pixels may be chosen as the mapped palette index. For example, the palette entry giving the smallest absolute error calculated for every color component between the reconstructed valued and the palette color may be chosen.

This method will convert all neighbor pixels into the palette indices, however, the error in this method may be quite large since there may be no palette color close to the reconstructed neighbor pixel. Thus, in some implementations, there may be a limit for such an error, and the limit may be fixed and known for both encoder and decoder or signaled in the bitstream in at least one parameter set such as VPS, PPS, SPS, slice header, at coding unit (CU) or coding tree unit (CTU) level flag, or elsewhere. When lossless coding mode is enabled, the error may be set to 0 normatively and no signaling may be needed.

When the error is greater than the limit, the neighbor pixel may be mapped to the escape pixel, and may be used later in copy-above mode in the current block. For example, when the escape pixel is located in the first row and its above pixel is the neighbor pixel mapped to the escape pixel.

Neighbor Pixels and Palette Predictor

The used neighbor pixels in the copy-above for the first line may be added to the palette predictor, i.e., every reconstructed color value may be added to the palette predictor as a new entry. This addition may be done conditionally, for example, when the palette predictor is not full. These entries may be added at any position within the palette predictor, for example, at the beginning of the palette predictor; after the current block palette entries and before the previous not used palette entries in the current block prediction; at the end of the palette predictor, or similar, or any combination.

Flag Indicating Usage of the Copy Neighbor Pixels

Since the copy neighbor pixels add some additional dependency on the neighbor block for the palette mode, it may be desirable in some application to not use neighbor pixels in the copy-outside mode. In this situation, a flag, or syntax element, or indicator may be signaled in at least one parameter set or parameter set extension, for example VPS, SPS, PPS, slice header, CU level, CTU level or elsewhere to indicate that the above neighbor pixel(s) for the copy-above mode for the first line are in use. For example, a flag equal to 1 may mean that the copy neighbor pixel(s) are used.

Optionally, the same flag (which can, for example, be denoted as copy_enable_flag) may control enabling copy-outside mode in general, which may be realized by using default palette index, or copy neighboring pixel values or mapping the neighboring pixels to palette indices, or other methods.

In another example, the copy_enable_flag signaling, for example in PPS extension may be dependent on the CIP flag. Since one of the solutions for the copy neighbor pixel values or mapped indices with CIP enabled, as discussed earlier, may be disabling the copy-outside mode and the default palette index may be used instead, the copy_enable_flag indicating the usage of copy-outside mode may be signaled only in the case when CIP flag is disabled (for example, equal to 0), and if not present the copy_enable_flag is inferred equal to 0 (or being enabled).

In yet another alternative, the CIP constraints associated with the copy-outside mode may be applied depending on the slice type. For example, the copy_enable_flag may control the usage of the copy-outside mode for non-I slices, or the slices where inter-prediction is available, possibly excluding intra block copy mode (in some implementation, the intra block copy mode may be realized through inter-prediction mode). In connection to CIP, the copy_enable_flag may be unconditionally signaled from the CIP flag and when the CIP flag is enabled the copy_enable_flag controls copy-outside mode or mapped indices depending on the slice type. For example, the copy_enable_flag controls enabling of the copy-outside mode (i.e., the copy-outside mode may be enabled or disabled) or mapped indices in I-slices or the slices where intra-prediction and intra block copy prediction are available, and the copy-outside mode is disabled for non-I slices or slices where inter-prediction is available, possibly excluding intra-block copy mode. The advantage of a slice based approach can be that the condition can be derived only once per slice and is not required to be dependent on the prediction mode of the neighboring blocks.

If more than one flag or syntax element is signaled, for example, a first flag in a parameter set or parameter set extension, for example, PPS extension, or slice header and a second flag is signaled at CU level, then the CU level flag may be signaled only if the PPS or slice header flag is enabled (equal to 1), otherwise the CU level flag is not signaled and is inferred to be disabled (i.e., equal to 0).

If the flag is disabled, meaning that copy-outside mode is not used, then the palette mode does not need to be signaled for the very first row of the block and palette mode is derived to be equal to the INDEX mode in that row.

In another example, a flag, which may the same as the copy_enable_flag, may be signaled to indicate whether the copy neighboring pixels (values or mapped indices) or using default palette index is applied for the first row in the block when copy-above mode is enabled. This flag can also control the changes required for both modes. For example, the palette index adjustment as discussed earlier may be disabled for the copy neighboring pixels, but the palette index adjustment may be used when default palette index is used, so the usage of index adjustment may be controlled by the flag. Additionally, in a similar way, the additional syntax optimization that may be applied for the copy-outside mode, such as discussed in the example related to syntax optimization, may be controlled by the same flag.

A flag may be bypass or entropy context coded (e.g., via a CABAC process). Context may be a signal context or be derived according to the block size, palette size, palette predictor size, palette scanning order, palette sharing mode, and usage of escape pixels and similar.

Syntax Optimization for the Copy from Above Neighbor Mode

As previously discussed, the syntax optimization for palette size equal to 0 and 1 may be done to avoid redundant signaling. However, this optimization may not be valid if the copy-outside mode is in use.

For example, assuming that reconstructed values are copied from the neighbor pixels, if the palette size is 0, this previously meant that only escape pixels are present in the block, and only escape values (color triplet) are signaled. However, when copy from above neighbor mode is enabled, the palette size can still be zero, however the palette mode can be copy_above or index, so it cannot be assumed that only escape pixels are used. In this case, the escape present flag, palette mode, palette run values have to be signaled. A similar observation can be made for the palette size equal to 1.

When copy-outside mode is used, according to some embodiments, an encoder/decoder may be configured to use a modified syntax including one or more of the features noted below. These syntax features may be applied separately or in any suitable combination:

Syntax Feature 1—Palette transpose flag may always be signaled

Syntax Feature 2—Escape present flag may always be signaled.

Syntax Feature 3—If the palette size is 0 and the escape present flag is 0, meaning that there are no escape pixels in the block, then all of the pixels are copied from the neighbor block. In this case, the palette mode, palette index, and palette run values are not needed to be signaled, and palette mode may be inferred to be equal to the copy-above mode. Further, the palette run value to be coded may be derived to be equal to the total number of pixels in the block minus 1. If palette size is 0 and the escape present flag is equal to 1, then the palette mode and palette run values are signaled, but the palette index is still not needed, and the palette index may be derived to be equal to the escape index when the palette mode is equal to the index mode.

Syntax Feature 4—If palette size is 1, then the palette mode and palette run values may be signaled. Additionally, if the escape present flag is 0, then only one index is possible. In this case, the palette index is not needed to be signaled and it may be derived to be equal to 0. If the escape present flag is equal to 1, then the palette index may be signaled.

Instead making any modification to the syntax optimization as discussed above, the bitstream conformance requirements may be applied, i.e., the encoder shall not choose and signal palette syntax elements which may break one of the syntax optimization rules. If one of the rules is violated then such a bitstream is treated as not conformant to the standard. As an example, the bit-stream may be constrained so that if the palette size is 0, copy from above neighbor mode (either value or index) may not be chosen within that block.

Example Flowchart for Referencing Neighboring Pixels for Palette Mode

Figure 9:
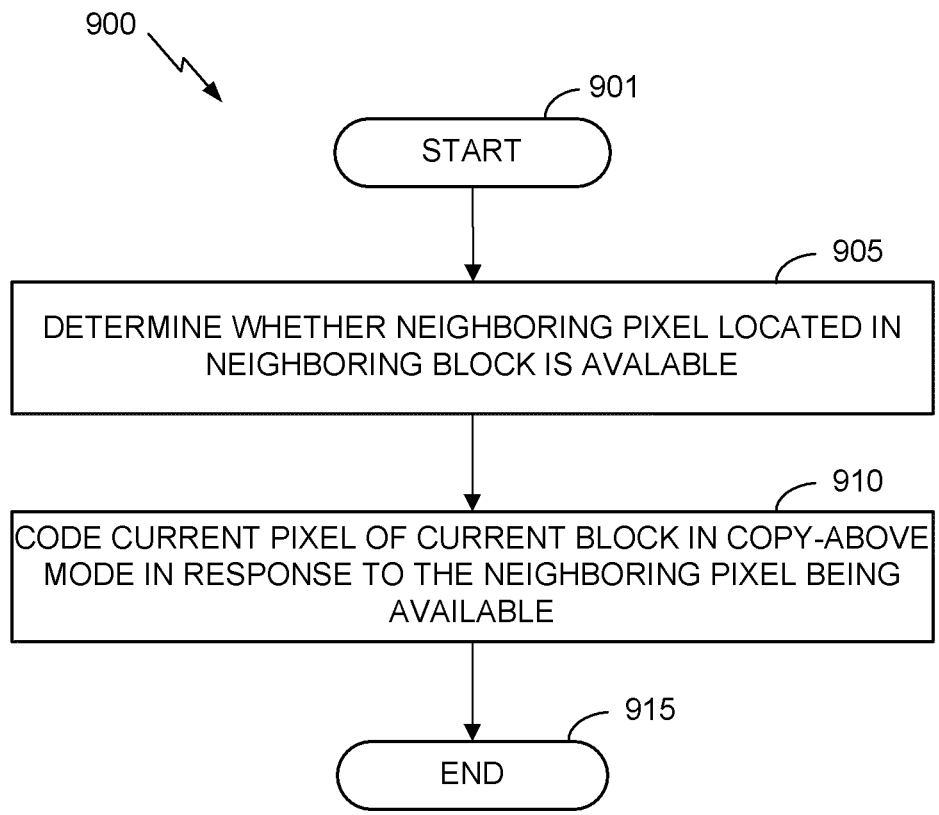
FIG. 9 is a flowchart illustrating another method for coding video data in accordance with aspects described in this disclosure.

With reference to FIG. 9, an example procedure for referencing neighboring pixels for coding video data in palette mode will be described. FIG. 9 is a flowchart illustrating a method 900 for coding video data in palette mode in accordance with aspects of the present disclosure. The steps illustrated in FIG. 9 may be performed by a video encoder (e.g., the video encoder 20), a video decoder (e.g., the video decoder 30), or component(s) thereof. For convenience, method 900 is described as performed by a video coder (also simply referred to as coder), which may be the video encoder 20, the video decoder 30, or another component.

The method 900 begins at block 901. At block 905, the coder determines whether a neighboring pixel that is located in a neighboring block is available. At block 910, the coder codes a current pixel of a current block of video data in copy-above mode via coding a run length value in response to the neighboring pixel being available. The current pixel is in the first line of the current block in scan order. The method ends at block 915.

In the method 900, one or more of the blocks shown in FIG. 9 may be removed (e.g., not performed) and/or the order in which the method is performed may be switched. In some embodiments, additional blocks may be added to the method 900. The embodiments of the present disclosure are not limited to or by the example shown in FIG. 9, and other variations may be implemented in accordance with the present disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for removing redundancies for coding video data in palette mode, the method comprising:
   coding a plurality of palette indices, each of the palette indices indicative of one or more color component values;
   coding a current pixel of a current block of the video data in copy-previous mode via coding a previous line index, the previous line index indicating a particular line from a plurality of lines including a pixel located above the current pixel in the current block, wherein the plurality of lines include lines other than a line including a pixel located directly above the current pixel in the current block, the pixel identified by the previous line index associated with one of the plurality of palette indices, the coding of the current pixel in copy-previous mode further comprising:
      identifying a number of candidate values for the previous line index,
      identifying a number of escape pixels in a column of pixels above the current pixel in the current block, the escape pixels being coded without reference to the plurality of palette indices,
      reducing the number of candidate values for the previous line index by the number of identified escape pixels,
      coding the previous line index based on the reduced number of candidate values, and coding the current pixel based on the palette index associated with the pixel identified by the previous line index; and transmitting the coded video data to a destination device over a data network.

2. The method of claim 1, wherein the coding of the previous line index comprises coding a distance between the previous line index and a current line index.

3. The method of claim 1, wherein the escape pixels are explicitly signaled in a bitstream.

4. The method of claim 1, wherein the current pixel is in the first or second line of the current block, wherein the coding of the current pixel in copy-previous mode further comprises:

bypassing the coding of the previous line index; and
coding a palette index equal to a predetermined value.

5. The method of claim 1, wherein the previous line index is coded via a truncated binary code.

6. A device for encoding video data, comprising:

a memory configured to store at least a portion of the video data; and at least one processor in communication with the memory and configured to:

code a plurality of palette indices, each of the palette indices indicative of one or more color component values;

code a current pixel of a current block of the video data in copy-previous mode via coding a previous line index, the previous line index indicating an index of a particular line from a plurality of lines including a pixel located above the current pixel in the current block, wherein the plurality of lines include lines other than a line including a pixel located directly above the current pixel in the current block, the pixel identified by the previous line index associated with one of the plurality of palette indices;

identify a number of candidate values for the previous line index;

identify a number of escape pixels in a column of pixels above the current pixel in the current block, the escape pixels being coded without reference to the plurality of palette indices;

reduce the number of candidate values for the previous line index by the number of identified escape pixels;

code the previous line index based on the reduced number of candidate values, and code the current pixel based on the palette index associated with the pixel identified by the previous line index; and transmit the coded video data to a destination device over a data network.

7. The device of claim 6, wherein processor is further configured to code a distance between the previous line index and a current line index.

8. The device of claim 6, wherein the escape pixels are explicitly signaled in a bitstream.

* * * * *